Jan. 18, 1938.                G. G. LANDIS                2,105,603
                         MOTOR PROTECTIVE DEVICE
                         Filed June 21, 1934
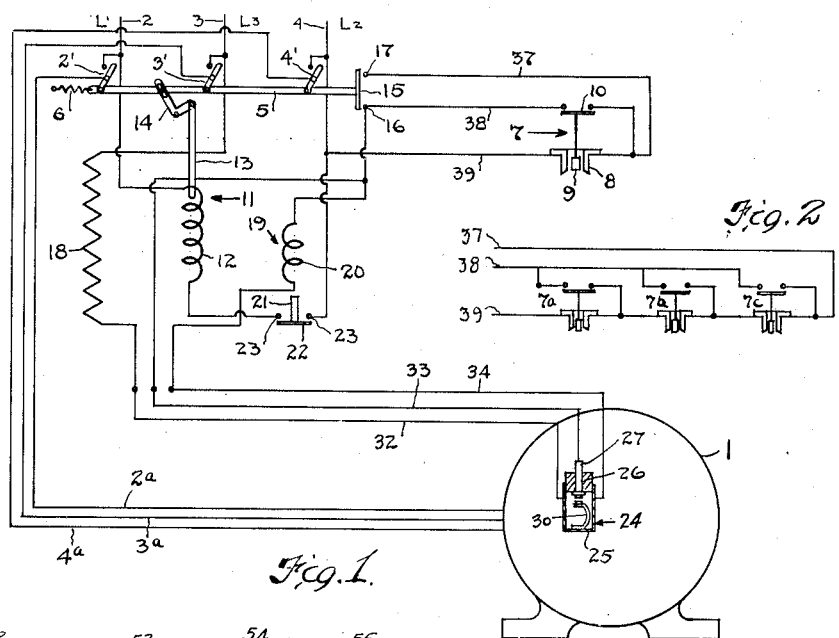
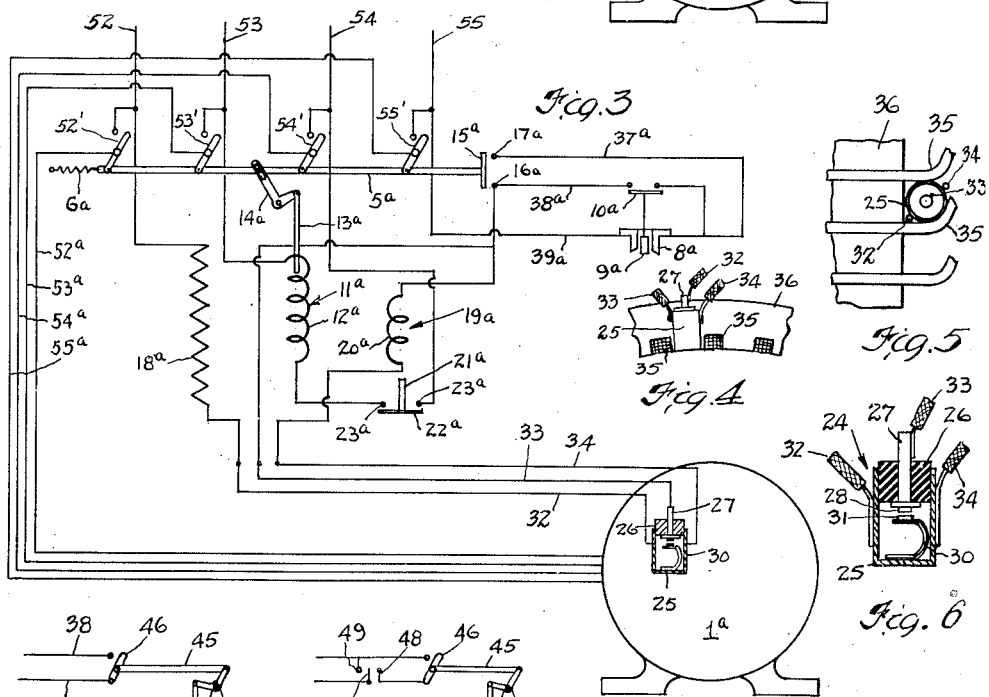
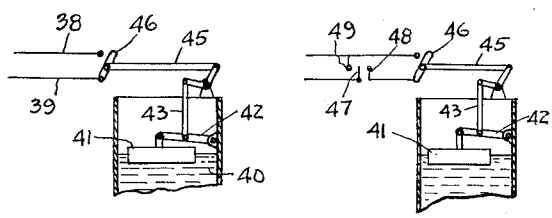
INVENTOR.
George G. Landis.
BY
Fay, Oberlin & Fay
ATTORNEYS Patented Jan. 18, 1938

2,105,603

UNITED STATES PATENT OFFICE

2,105,603

MOTOR PROTECTIVE DEVICE

George G. Landis, Cleveland, Ohio, assignor to The Lincoln Electric Company, Cleveland, Ohio, a corporation of Ohio Application June 21, 1934, Serial No. 731,784

4 Claims. (Cl. 175—294)

This invention relates as indicated to motor protective devices and pertains more particularly to a device whereby a dynamo-electric machine may be protected against running while in an over-heated condition such as would damage the machine and furthermore, a device adapted to protect a polyphase dynamo-electric machine against operation under phase-blocked conditions which would have a tendency to destroy or injure the motor, were the same permitted to operate under such conditions.

It is among the objects of my invention to provide a device of the above described character which is effective to protect a dynamo-electric machine such as a motor from over-heating.

It is a further object of my invention to provide a device of the character described employing a thermosensitive switch imbedded in the windings of the machine so that as soon as the temperature of the windings rises to a dangerous point the machine will be automatically de-energized and stopped.

It is a further object of my invention to provide a thermosensitive switch unit adapted for use in the above mentioned type of apparatus characterized by the fact that it is a self-contained unit so that it may be inserted or imbedded within the windings of the machine, i. e., it does not require to be supported on the frame structure of the machine.

It is a further object of my invention to provide a thermosensitive protective device for dynamo-electric machines characterized by the use of a thermosensitive switch of extremely low thermal capacity so that the switch will immediately respond to temperature rises within the machine so that the machine will be stopped before there has been any possibility of damage occurring to the windings.

It is a further object of my invention to provide a device of the character described in which the thermosensitive switch is normally open so that a much smaller switch may be employed to control a given circuit than if the switch were normally closed and required to break a circuit in order to effect the desired control.

It is a further and more particular object of my invention to provide a device of the character described in which a part of the control circuit for the dynamo-electric machine is completed through the protective element assembly imbedded in the machine, thus making it impossible for the motor to be operated unless the protective element imbedded in the machine is properly connected in the system.

It is a further object of this invention to provide a protective control system for dynamo-electric machines, particularly polyphase machines, effective to stop the machine upon any phase failure of the power circuit.

Other objects of my invention will appear as the description proceeds.

To the accomplishment of the foregoing and related ends, said invention, then consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a diagrammatic representation of the arrangement of a plurality of starting switches whereby the dynamo-electric machine and the control system associated therewith as illustrated in Fig. 1 may be energized from any one of a plurality of spaced stations; Fig. 3 is a diagrammatic representation of a system similar to that illustrated in Fig. 1 but applied to a two-phase, four-wire system; Fig. 4 is a fragmentary side elevational view of the portion of the stator of the dynamo-electric machine shown in the previous figures illustrating the manner in which the thermosensitive switch cartridge is imbedded in the windings of the machine; Fig. 5 is a fragmentary plan view of the structure illustrated in Fig. 4; Fig. 6 is a transverse sectional view of the cartridge shown in Figs. 4 and 5 and containing the thermosensitive switch element; Fig. 7 illustrates a pilot device such as may be employed in conjunction with a two-wire maintained contact switch adapted to be employed in conjunction with the systems illustrated in Figs. 2 and 3; and Fig. 8 is a view similar to Fig. 7 but showing the pilot device connected with a three-way hand-switch which is included in the same circuit with the pilot switch.

Referring now more particularly to the drawing and more especially to Fig. 1, the system comprising my invention and presently to be explained is shown associated with a dynamo-electric machine such as a motor generally indicated at 1. The system is shown connecting the motor to a three-phase power line, the incoming leads of such line being represented by 2, 3, and 4. Leads 2a, 3a, and 4a extend from the motor to switch blades 2', 3', and 4' respectively, which are adapted to make contact with leads 2, 3, and 4, respectively. The contact blades 2', 3', and 4' are all shown as pivotally supported at their central points and at their lower ends connected by a bar 5 by which all of such blades may be simultaneously actuated. A spring generally indicated at 6 resiliently urges the bar 5 to the left and consequently, the blades 2', 3', and 4' out of contact with their associated power leads. The starting switch for the motor 1, generally indicated at 7, may be of the type such as is illustrated in U. S. Patent No. 1,884,569 to Chapman; such switch including concentric members 8 and 9, the latter being depressed by the operator when he desires to start the machine and the former being depressed when he desires to stop the machine.

It is to be noted in connection with switch 7 that contact member 8 is normally in engagement with the leads shown attached thereto; whereas, contact member 9, or more particularly the contact bar associated therewith and generally indicated at 10, is normally out of engagement with the contact points associated with the leads adjacent thereto.

No. 11 generally indicates a relay comprising a winding 12 and an armature 13, the latter being connected with the switch bar 5 by means of a bell crank 14; so that when the winding 12 is energized, the armature 13 will be attracted thereto causing a clockwise rotation of the bell crank 14, a movement to the right of the bar 5 and a counter-clockwise rotation of each of the blades 2', 3', and 4' into engagement with the power leads 2, 3, and 4. The switch bar 5 terminally carries an interlock bar 15 adapted, when the switch blades 2', 3', and 4' are closed in the manner just described, to bridge the contact points 16 and 17.

No. 18 designates a resistance either fixed or variable through which one side of the shell of the protective unit presently to be explained is connected to the power lead 3.

No. 19 generally indicates a second relay comprising a winding 20 and an armature 21. The armature 21 carries a contact bar 22 adapted to be brought into bridging engagement with contact points 23 in an extension of the power lead 4.

Associated with the above described wiring system and imbedded in the machine in the manner presently to be explained is a protective unit generally indicated at 24 in Fig. 6. The protective unit 24 comprises a cylinder shell or cartridge 25 having a closed bottom and an open top. Into the open top of the cartridge 24 there is mounted a block 26 which serves the dual purpose of closing the cartridge and of supporting an electrode 27 which, at its lower end, carries a contact button 28.

Mounted within the cartridge 25 is a re-bent bi-metallic thermosensitive strip 30 secured at its lower end to the bottom of the cartridge and at its upper end carrying a contact button 31.

Leads 32, 33, and 34 are connected with the protective unit as illustrated in Fig. 6, in the following manner:—Leads 32 and 34 being both connected to the shell 25 and therefore in electrical communication with each other and the lead 33 being connected to the electrode 27 and in electrical communication with the shell 25 only, when the cartridge has been heated to such an extent as to cause the bi-metallic strip 30 to move the contact button 31 into engagement with the button 28.

After the parts of the protective device 24, as illustrated in Fig. 6, are properly assembled as illustrated in this figure, with the proper spacing between the contact buttons 28 and 31, and with the several leads 32, 33, and 34 connected thereto, the assembled unit will preferably be wrapped with some insulating material such as insulating paper or the like. After being so wrapped, the protective unit is inserted, as illustrated in Figs. 4 and 5, between adjacent coil noses 35 at the edge of the stator 36. After the stator has been wound and the protective unit inserted in the windings thereof, as just explained, the entire assembly will be dipped in some thermo-plastic airdrying compound usually employed for this purpose, which is effective to additionally insulate the various parts, as well as to render them water and/or oil impervious. It will be noted that the protective unit constructed in accordance with my invention being in the form of a self-contained element or cartridge, may be inserted in the windings in the machine and need not be bolted or similarly secured to the frame structure as has been necessary with devices of this character in the prior art. The positioning of the protective unit in the windings places the same in the very zone in which a harmful rise in temperature is to be guarded against. The fact that the protective unit comprises a substantially hermetically sealed cartridge in which the thermosensitive switch is housed prevents deterioration or fouling of such switch which might occur were the same exposed. Corrosion and like deterioration is also prevented so that it is possible to use fine silver contact buttons for the members 28 and 31 so as to insure that proper contact will be made when the switch closes due to the rise in temperature. This is particularly essential for the reason that the switch after being installed may remain open for a very long time before the motor is overheated to the point where it will close to energize the protective circuit.

The operation of the above described system is briefly as follows:—With the parts as positioned in Fig. 1 let us assume that the operator desires to start the machine: He will first move upwardly the member 9 so that the bar 10 bridges the contact buttons adjacent thereto. This will result in an energization of the coil 20 of the relay 19, causing the armature 21 of such relay to be moved upwardly until the bar 22 closes the circuit between contact buttons 23. Coil 12 of relay 11 will, therefore, be connected across power lines 2 and 4. Energization of the coil 12 will pull the armature 13 downwardly, closing switch blades 2', 3', and 4' in the manner hereinbefore explained. Simultaneous with the closing of the switch blades which connect the motor across the power lines the interlock bar 15 moves into engagement with contact buttons 16 and 17 so that the relay 19 remains energized even after the operator takes his finger off from the starting button 9. So long as the relay 20 remains energized, therefore, the circuit through the relay 11 will be complete and the main switch accordingly remain closed.

Let us assume now that the temperature of the motor reaches a predetermined point: The bi-metallic strip 30 will flex so as to bring together contact buttons 28 and 31. This closing of the thermosensitive switch short-circuits the coil of relay 19, so that the armature 21 drops, causing the contact bar 22 to move out of engagement with the contact points 23. The circuit through the holding coil, i. e., the main relay holding main switch closed, will, therefore, be broken so that the spring 6 will move the bar 5 to the left restoring the parts to the position illustrated in Fig. 1. The system just described also provides for phase failure protection in the following manner:—If supply line 2 is not connected or should fail while the motor is standing idle, the motor cannot be started; if supply line 2 fails while the motor is running under idling conditions, i. e., under no load, the motor will operate in effect as a phase converter, i. e., continue to run at full speed without any damage thereto. If, however, the motor is running under load and supply line 2 fails, and the motor stalls, such stalling of the motor would cause the windings, particularly in large size motors, to burn out in a much shorter interval than that in which any thermosensitive protective device can be relied upon to operate and afford proper protection. If supply line 2 fails while the motor is running and the motor stalls, the winding 20 of the relay 19 remains energized holding the bar 22 in contact with the button 23. The winding 12 of the main relay now has applied across its terminals half of the line voltage since when one line of a polyphase machine fails, whether the machine is Y or delta connected, the voltage between the line that has failed and any one of the other lines is equal to half the voltage across the two live lines. The relay 11 or more particularly the coil 8 thereof is so designed that when the voltage impressed thereacross is reduced to one-half of the maximum line voltage upon which the apparatus is designed to operate, such reduced energization will not be sufficient to overcome the action of the spring 6; the spring 6, therefore, overcoming the pull of the solenoid 11 causing the main switch to open.

If power line 3 fails while the motor is stopped, the motor cannot be started. If such line fails while the motor is idling, the motor will continue to operate in the manner described when power line 2 fails. If, however, the motor is running under load and power line 3 fails and the motor stalls, a voltage equal to one-half of the line voltage is applied across the terminals of the winding 20, which winding is in series with the resistance 18. The coil 20 is, therefore, likewise designed so that when its degree of normal energization is reduced to 50% thereof, the armature 21 will drop, causing the bar 22 to open the circuit of the relay 11. When the circuit of the relay 11 is opened the main switch, of course, will be opened by the action of the spring 6 in the manner previously explained.

If line 4 fails while the motor is stopped, the motor cannot be started. If this line fails while the motor is idling, the motor will continue to run as explained in connection with the failure of lines 2 and 3. If, however, line 4 fails while the motor is running under load and the motor stalls, windings 12 and 20 of the two relays, as well as the resistance 18, are all thrown in series across lines 2 and 3. The two windings thus connected in series with the resistance unit will be de-energized to such an extent as to permit the armature 21 to drop as well as the armature 13 to be moved upwardly under the influence of the spring 6. This, of course, will result in an opening of the main switch and a stopping of the machine so as to prevent its further operation under blocked phase conditions which would be ruinous to the motor.

As previously indicated, there are three leads, namely Nos. 32, 33, and 34, leading to the protective unit imbedded in the motor which includes the thermosensitive switch. Since the circuit of the winding 20 of relay 19 is completed by means of leads 32 and 34 through the shell 25 of the protective unit, obviously the motor cannot be run unless these two leads are properly connected as shown. While in the drawing lines 32 and 34 are shown connected to each other through the shell 25, of the protective cartridge, it is possible, of course, to vary such arrangement without departing from the principles of my invention by directly connecting lines 32 and 34 to each other in some other fashion within the motor so long as the three leads 32, 33, and 34 are brought out of the motor so as to require that they be properly connected in order that the protective system may permit the motor to be started. In the appended claims where reference is made to a completion of the protective circuit or a part thereof through the "protective unit assembly" is meant, therefore, that the leads 32 and 34 may be connected either through the shell 25 or directly to each other within the machine. In all thermosensitive motor protective devices used heretofore only two leads have been used by which to connect the same in the control circuit. I prefer to use the additional lead in the protective circuit according to my invention in order that such protective system may not be rendered inoperative by failure of the electrician to connect the leads running from the control panels to the protective unit in the motor. This is particularly advantageous when using a normally open thermosensitive switch by which to protect the motor against overheating. If the normally open thermosensitive switch were not connected in the system arranged according to the teachings of the prior art, the motor would still operate but when it became so heated as to close the thermosensitive switch, such switch, not being connected, would be ineffective to stop the motor. I overcome this possibility, as above explained, by using the third lead.

If none of the leads from the protective device are connected in the system, the relay 19 will not be energized for the reason that the circuit between lines 32 and 34 would not be complete. If all three leads 32, 33, and 34 are short-circuited, the relay 19 is likewise short-circuited because under such condition the lead 32 would be short-circuited to either or both of leads 32 and 34. If line 32 were not connected but proper connections were made to lines 33 and 34, the relay 19 could not be energized. The same result would obtain if line 34 were not connected and proper connections were made to lines 32 and 33.

It will thus be seen that the protective system arranged in accordance with the principles of my invention provides proper protection against over-heating of the motor, as well as proper protection against blocked phase operation of the motor and furthermore, the system as arranged insures that the electrician installing the same must make the proper connections so as to render the protective device functional before it is possible to run the motor.

As illustrated in Fig. 2, the single starting and stopping switch 7 shown in Fig. 1 may be supplanted by a plurality of such switches connected with the leads 37, 38, and 39 in the manner illustrated in Fig. 2. A plurality of such starting and stopping switches may be employed with a single motor so that the starting and stopping of such machine may be controlled from a plurality of spaced stations.

If it is desired to operate the motor 1 by means of a maintained contact switch operated from a pilot device expedients such as are illustrated in Figs. 7 and 8 may be adopted.

When the expedient such as is illustrated in Fig. 7 is employed, the lead 37 as well as the interlock bar 15 illustrated in Fig. 1 will be omitted, only leads 38 and 39 being retained.

Assuming that the motor 7 operates a water pump or the like used to maintain a proper liquid level in a container such as 40: As soon as the liquid level in the container 40 drops to a predetermined point, the float 41 will cause a counterclockwise rotation of the lever 42 for a distance sufficient so that through the linkage 43, 44, and 45 the switch blade 46 will close the circuit between lines 38 and 39. The circuit between these lines will remain closed until the liquid level is again restored so that the flow rising opens the switch 46.

The arrangement illustrated in Fig. 8 is identical with that illustrated in Fig. 7 so far as the pilot device is concerned, the only change being in the provision of a hand-switch 47 which, when moved into contact with the lead 48, renders the pilot device effective to control the operation of the motor. The motor may be controlled manually, however, by selectively moving the switch 47 into contact with the lead 49.

The adaptation of the system to a pilot control as just explained, in no way interferes with the operation of the protective system generally, as previously explained, the only change being the manner in which the connection is made between leads 38 and 39 during the normal stopping and starting of the motor.

In Fig. 3 there is illustrated a scheme wherein the protective system previously explained is shown adapted to a two-phase four-wire power circuit to a motor. The operation of the system illustrated in this figure, as well as the arrangement of the various parts, is substantially identical with that of the system illustrated in Fig. 1, the only difference being that here four power leads 52, 53, 54, and 55 respectively are provided which have an equal number of main switch blades 52', 53', 54', and 55' associated therewith. The common switch bar 5a, the springs 6a and the various other parts are similar in their construction and operation with those illustrated in Fig. 1 so that similar reference characters having the subscript "a" will be employed to designate like parts in this figure.

The employment of the resistance unit 18 and 18a in series with the thermosensitive switch so that in effect such switch operates in a low voltage control circuit, is an important feature of this invention. The utilization of this low voltage control circuit makes possible the use of a small thermosensitive protective device which has sufficiently low thermal capacity as to afford proper protection for the motor windings with which the same is associated.

Motors of considerable size have been successfully protected by means of a protective device housing the thermosensitive switch, which cartridge is only approximately ¼" in diameter and ½" long. This small size of unit reduces its thermal capacity to such an extent that the temperature of the bi-metallic strip comprising one element of the thermosensitive switch closely follows the temperature of the coils which are to be protected. The fact that the thermosensitive switch is normally open enables me to set the contacts 28 and 31 so close together that only a slight amount of movement is necessary in order to energize the protective system and to cause a stopping of the motor. It is, therefore, possible to produce a protective device which is extremely sensitive to temperatures and which may be relied upon to function in the desired manner when the occasion demands.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. The combination with a dynamo-electric machine and a switch for connecting the same with a power line, of a control circuit for said machine, said control circuit including a holding coil for maintaining said switch closed while the machine is running, a relay for energizing said holding coil, a protective unit assembly mounted in the machine, said protective unit assembly so connected that the control circuit through said relay is completed through said assembly, and a normally open thermosensitive switch in said unit so connected in said control circuit that when the temperature of the machine rises to a predetermined point closing said thermosensitive switch, said holding coil will be short-circuited to permit said main switch to open.

2. The combination with a polyphase dynamo-electric machine and a main switch, having a holding coil, for connecting the machine to a polyphase power circuit, said holding coil being controlled by a relay, of a protective unit assembly imbedded in the machine, a control circuit connected through said protective unit assembly and effective upon failure of any phase of the power circuit to at least partially de-energize said relay and permit said main switch to open, and a thermosensitive switch in said protective unit so connected to said protective unit as to shunt said relay when the temperature of the machine reaches a predetermined point.

3. The combination with a polyphase dynamo-electric machine and a main switch, having a holding coil, for connecting the machine to a polyphase power circuit, said holding coil being controlled by a relay, of a protective unit assembly imbedded in the machine, a control circuit connected through said protective unit assembly and effective upon failure of any phase of the power circuit to at least partially deenergize said relay and permit said main switch to open, and a normally open thermosensitive switch in said protective unit so connected to said protective unit as to shunt said relay when the temperature of the machine reaches a predetermined point.

4. A control circuit for a dynamo-electric machine comprising a main switch in the power lines to said machine, a relay associated with said main switch and effective when energized to maintain said switch closed, a thermo-sensitive protective unit assembly imbedded in the machine, the circuit of said relay being completed through said protective unit, and a normally open thermo-sensitive switch in said protective unit and so connected in said control circuit that when the temperature of the machine rises to a predetermined point said thermosensitive switch will be closed and deenergize said relay.

GEORGE G. LANDIS.